US009339110B2

(12) United States Patent
deRoy VanZuydewyn

(10) Patent No.: US 9,339,110 B2
(45) Date of Patent: May 17, 2016

(54) TABLE ACCESSORY

(71) Applicant: David Charles deRoy VanZuydewyn, Surrey (CA)

(72) Inventor: David Charles deRoy VanZuydewyn, Surrey (CA)

( * ) Notice: Subject to any disclaimer, the term of this patent is extended or adjusted under 35 U.S.C. 154(b) by 0 days.

(21) Appl. No.: 14/947,140

(22) Filed: Nov. 20, 2015

(65) Prior Publication Data

US 2016/0073778 A1    Mar. 17, 2016

Related U.S. Application Data

(63) Continuation-in-part of application No. 14/270,520, filed on May 6, 2014, now abandoned.

(51) Int. Cl.
| | |
|---|---|
| *F16M 11/00* | (2006.01) |
| *A47B 83/04* | (2006.01) |
| *A47B 37/04* | (2006.01) |
| *F16C 11/10* | (2006.01) |
| *A47B 96/02* | (2006.01) |
| *F16M 13/02* | (2006.01) |

(52) U.S. Cl.
CPC ............... *A47B 83/04* (2013.01); *A47B 37/04* (2013.01); *A47B 96/02* (2013.01); *F16C 11/10* (2013.01); *F16M 13/022* (2013.01)

(58) Field of Classification Search
CPC .......... B25H 1/06; B25H 1/0042; B25H 1/04; B25H 1/16; A47B 13/06; A47B 37/04; A47B 3/14; F16M 11/26
See application file for complete search history.

(56) References Cited

U.S. PATENT DOCUMENTS

| | | | | | |
|---|---|---|---|---|---|
| 2,647,562 | A | * | 8/1953 | Hoffar ...................... | A47B 3/14 108/35 |
| 3,225,865 | A | * | 12/1965 | Downey ................... | B25H 1/06 108/160 |
| 4,052,100 | A | * | 10/1977 | Nikitits .................... | A47B 3/14 108/35 |
| 4,239,195 | A | * | 12/1980 | Oltman ................... | B25B 1/125 144/286.1 |
| 4,296,834 | A | * | 10/1981 | Kroger ..................... | B25H 1/06 182/155 |
| 4,461,370 | A | * | 7/1984 | Connell ................... | B25H 1/06 182/153 |
| 4,779,857 | A | * | 10/1988 | Maund ................. | B25H 1/0042 144/48.3 |
| 4,826,244 | A | * | 5/1989 | Choi ........................ | A47B 3/14 108/35 |
| 4,974,651 | A | * | 12/1990 | Carmon ............... | B23D 47/025 144/286.1 |
| 5,709,373 | A | * | 1/1998 | Wasylynko ............ | A63C 11/14 269/16 |

(Continued)

*Primary Examiner* — Bradley Duckworth

(57) ABSTRACT

Disclosed are table accessories comprising: a) a first vertical beam at a first end and a second vertical beam at a second end; b) at least one first angled beam rotatably connected to the first vertical beam; c) at least one second angled beam rotatably connected to the second vertical beam; d) a long horizontal beam rotatably connected to the first angled beam; e) a short horizontal beam rotatably connected to the second angled beam; and f) a internal horizontal beam extender portion capable of adjoining the long horizontal beam and the short horizontal beam and extending the length thereof.

18 Claims, 14 Drawing Sheets

(56) References Cited

U.S. PATENT DOCUMENTS

| | | | | |
|---|---|---|---|---|
| 6,039,416 A * | 3/2000 | Lambert | A47B 5/06 108/48 |
| 6,161,807 A * | 12/2000 | Steiner | F16M 11/00 182/181.1 |
| 6,745,804 B2 * | 6/2004 | Welsh | B25H 1/04 108/131 |
| 6,796,446 B2 * | 9/2004 | Segall | A47G 25/0664 211/204 |
| 6,837,501 B1 * | 1/2005 | Hedrick | B62B 1/002 144/286.1 |
| 7,077,421 B2 * | 7/2006 | Wu | B25H 1/04 280/30 |
| 7,377,525 B1 * | 5/2008 | Whitmore | B25H 1/04 280/39 |
| 7,628,186 B2 * | 12/2009 | Blum | B25H 1/08 108/115 |
| 8,182,032 B2 * | 5/2012 | Dickey | A47B 3/14 297/157.1 |
| 8,403,313 B2 * | 3/2013 | Miller | F16M 11/02 269/139 |
| 8,651,030 B2 * | 2/2014 | Coffman | A47B 3/0911 108/169 |
| 8,820,826 B2 * | 9/2014 | Dickey | A47B 3/14 297/121 |
| 8,931,421 B2 * | 1/2015 | Tsai | A47B 3/087 108/132 |
| 8,931,529 B2 * | 1/2015 | Fregeau | B25H 1/06 144/286.1 |
| 2002/0105129 A1 * | 8/2002 | Levy | B25H 1/04 269/45 |
| 2004/0069913 A1 * | 4/2004 | Martens | B25H 1/06 248/161 |
| 2006/0181114 A1 * | 8/2006 | Nye | A47B 3/14 297/158.3 |
| 2006/0289320 A1 * | 12/2006 | Miller | B25H 1/04 206/373 |
| 2007/0006784 A1 * | 1/2007 | Thrush | A47B 37/04 108/129 |
| 2007/0131306 A1 * | 6/2007 | Snider | B25H 1/06 144/286.1 |
| 2009/0000522 A1 * | 1/2009 | Collins | B25H 1/04 108/12 |
| 2009/0078165 A1 * | 3/2009 | Tseng | A47B 3/0912 108/6 |
| 2011/0024235 A1 * | 2/2011 | Johnson | B25H 1/06 182/186.3 |
| 2013/0062823 A1 * | 3/2013 | Boyd | B25H 1/06 269/17 |
| 2013/0181385 A1 * | 7/2013 | Bowness | B27B 17/0041 269/13 |
| 2014/0021670 A1 * | 1/2014 | Geraghty | B25H 1/06 269/237 |
| 2014/0145044 A1 * | 5/2014 | Ceravolo | F16M 11/22 248/157 |
| 2014/0191093 A1 * | 7/2014 | Ceravolo | F16M 13/022 248/157 |

* cited by examiner

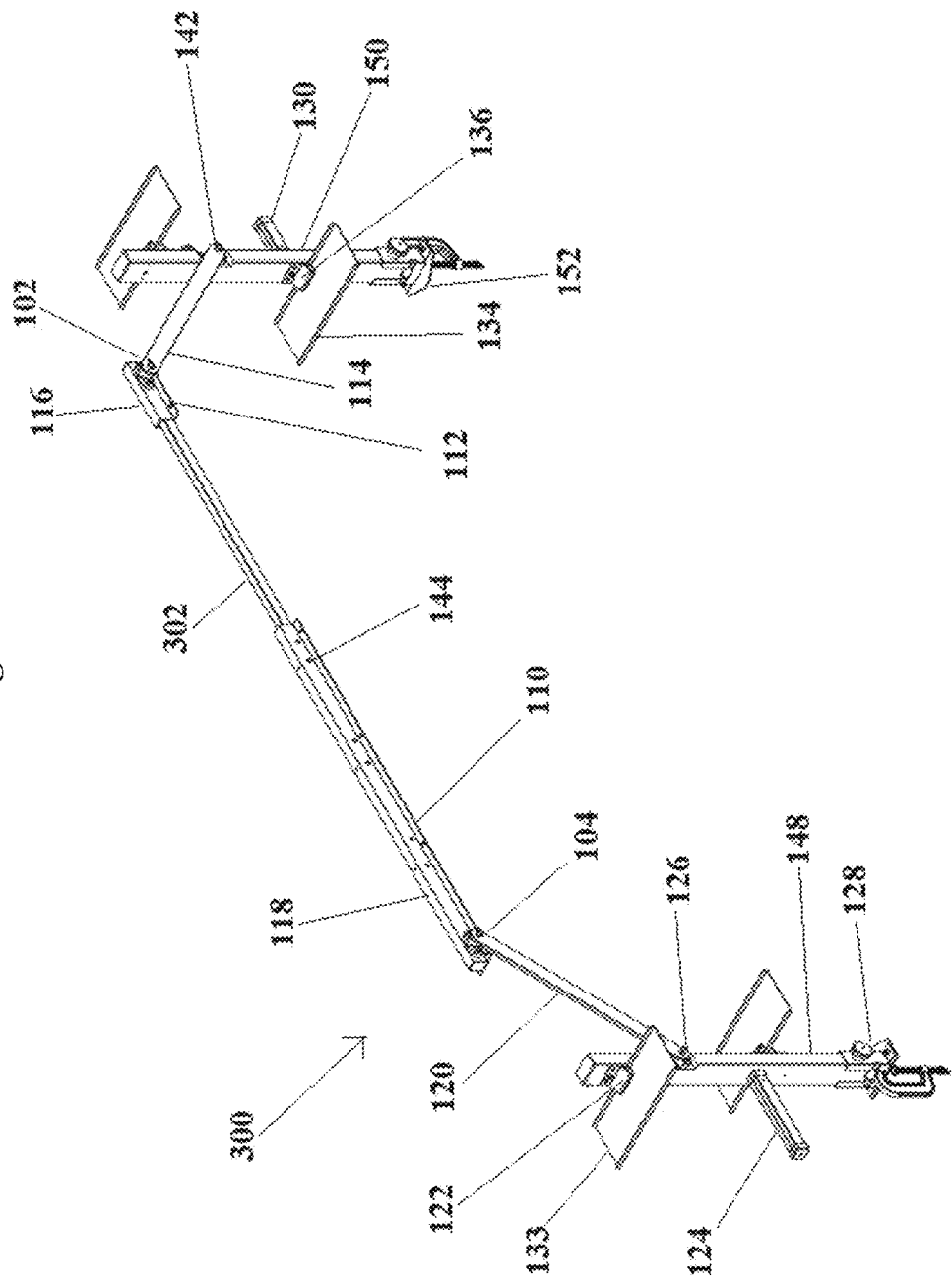

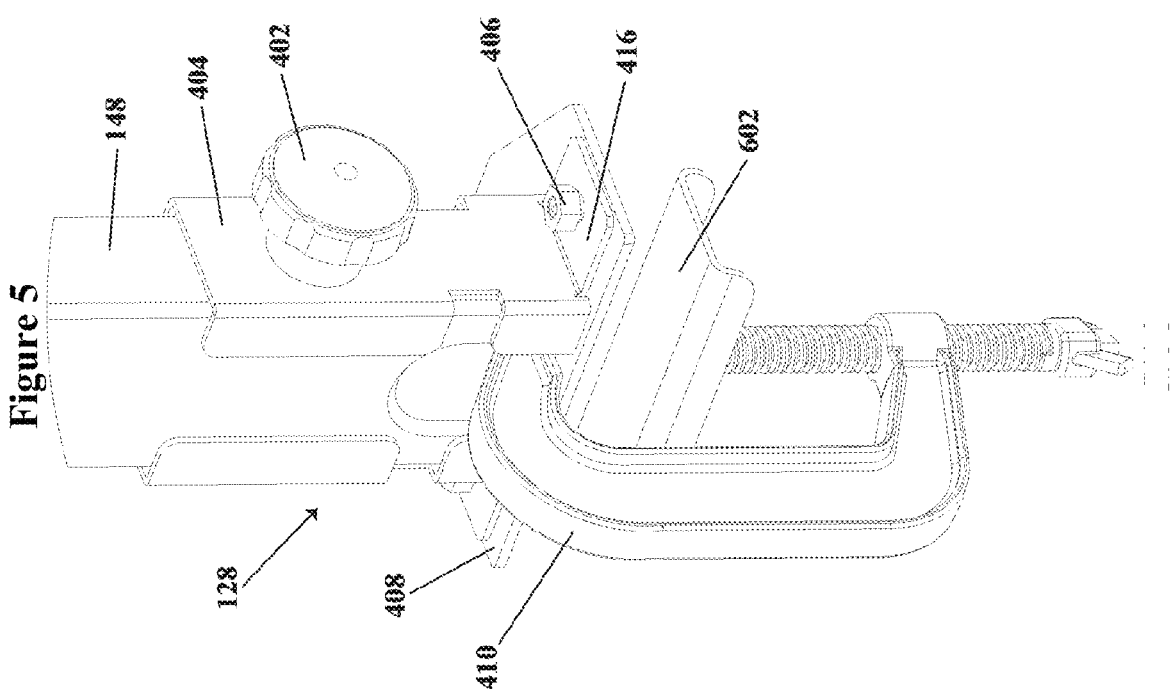

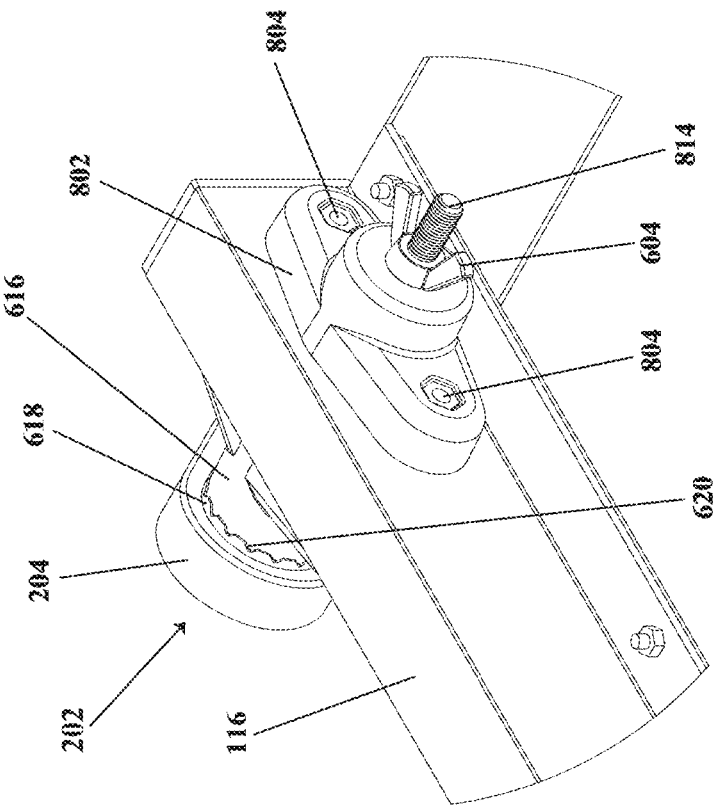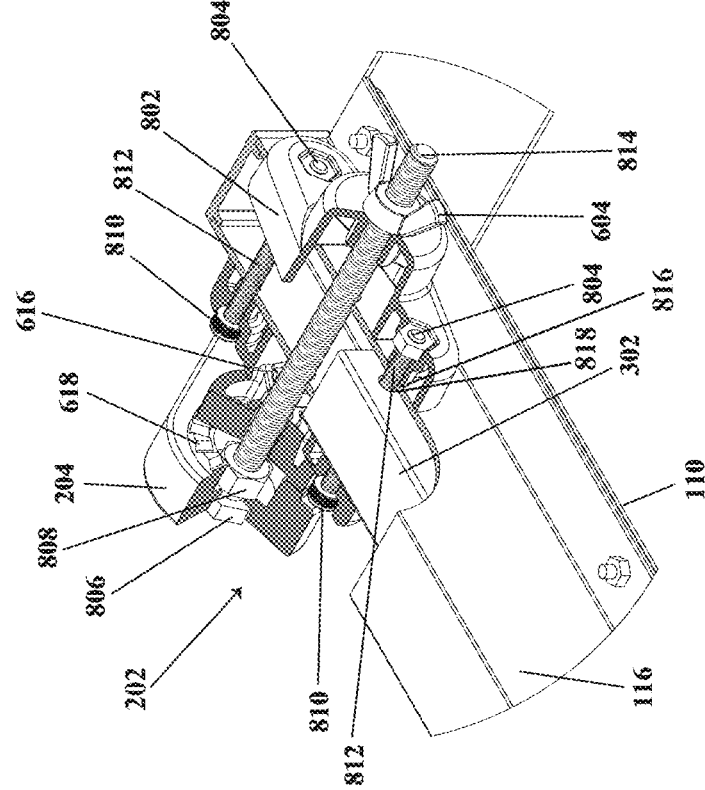

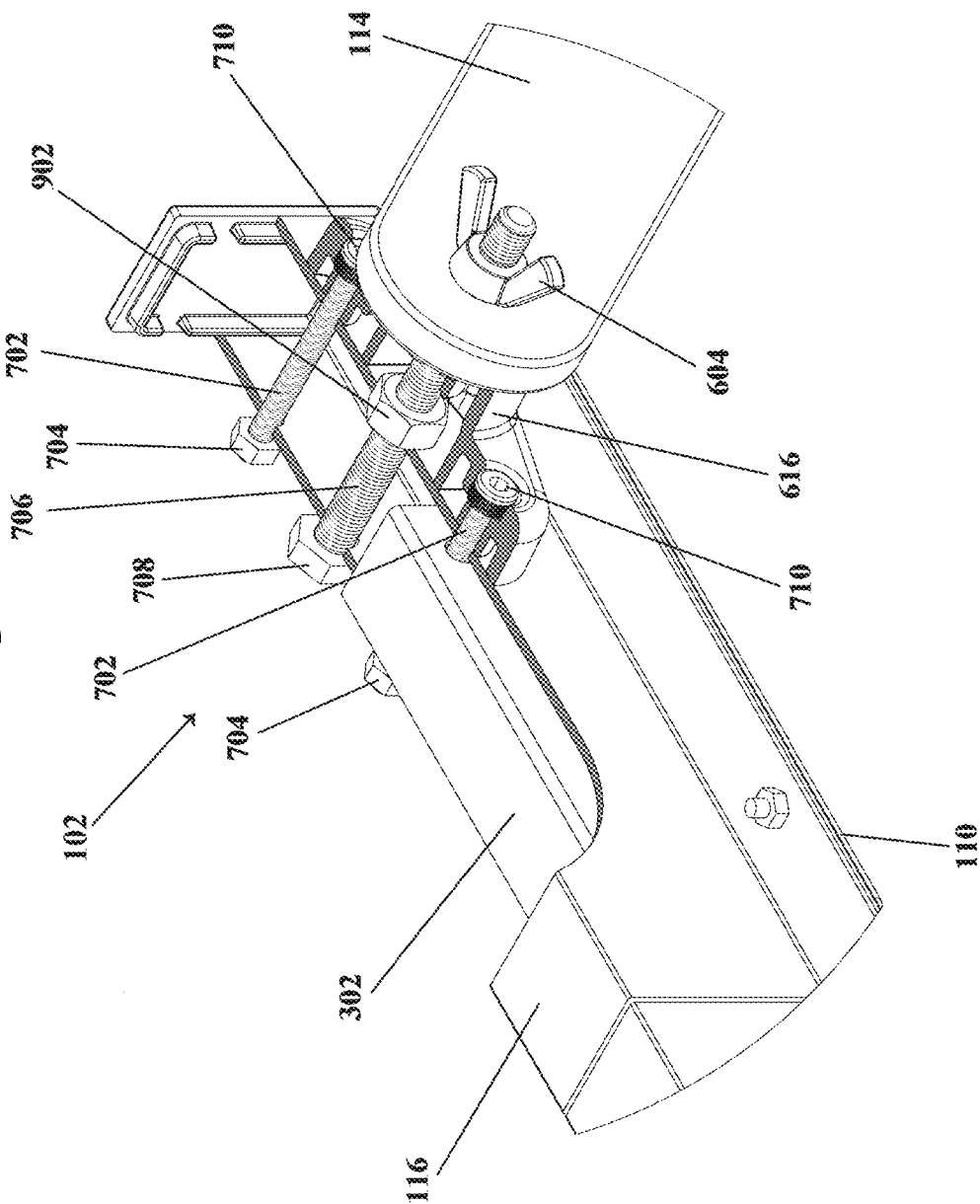

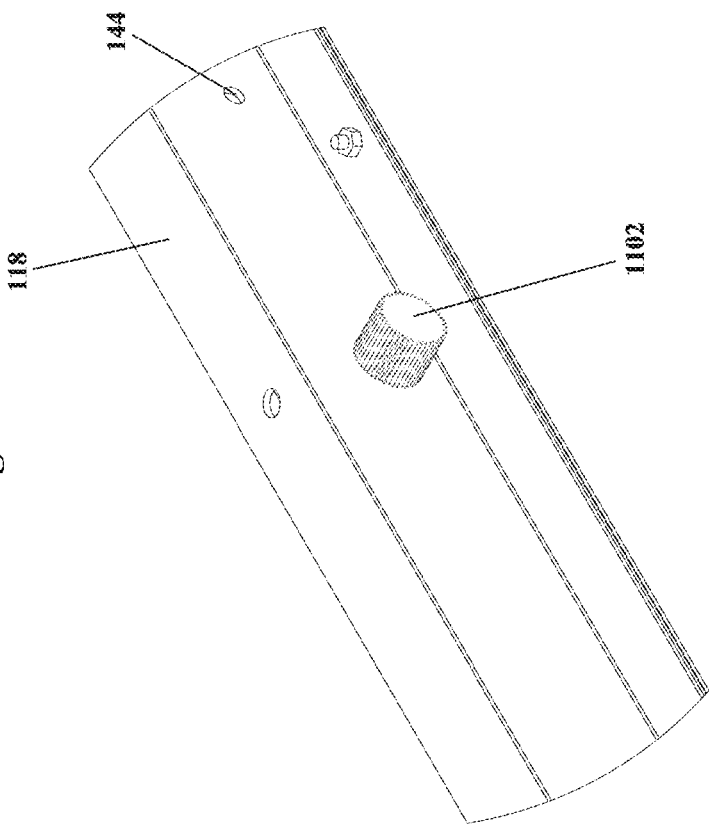
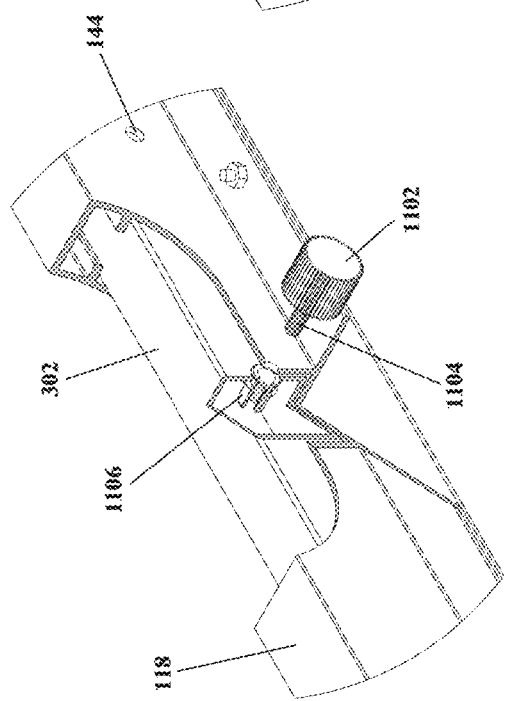
Figure 11A
Figure 11B

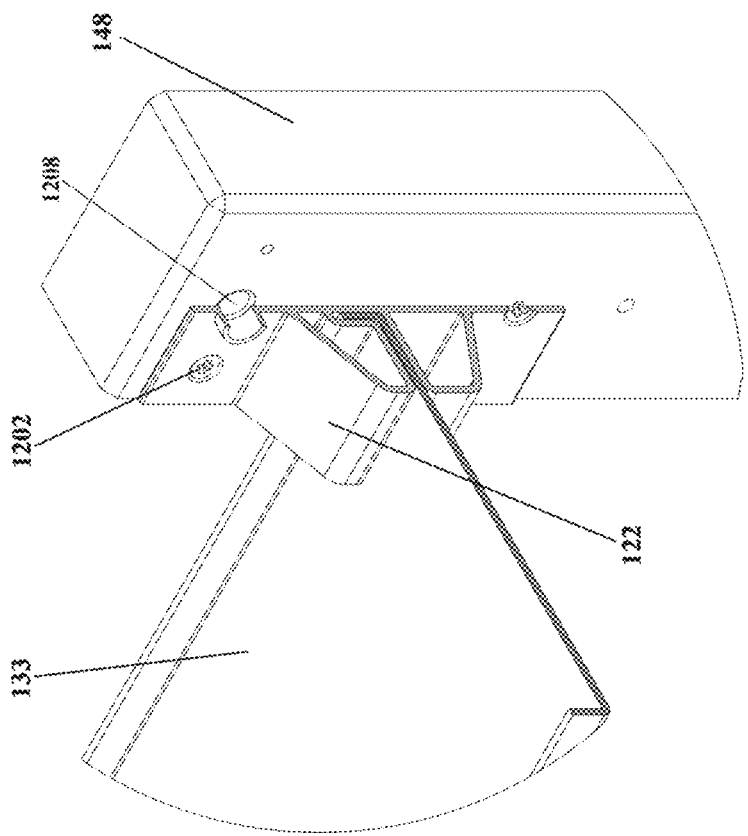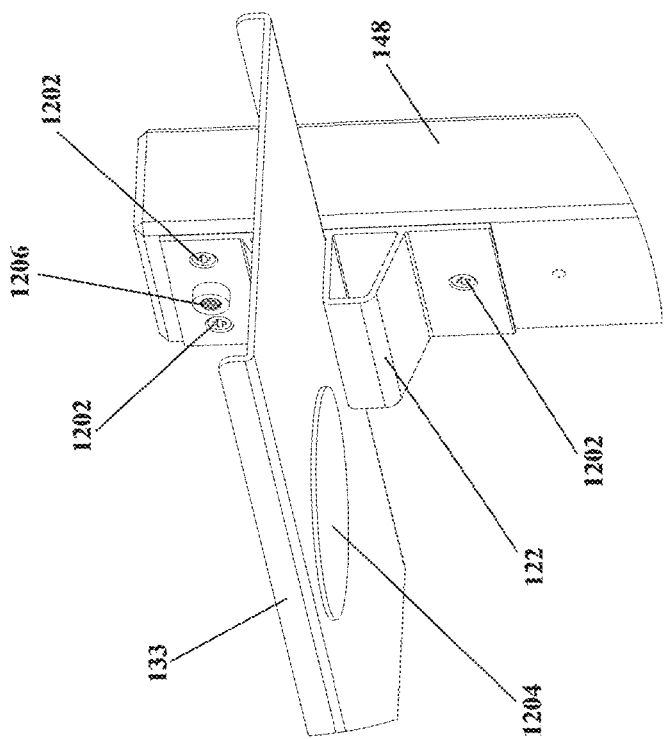
Figure 12A
Figure 12B

TABLE ACCESSORY

CROSS REFERENCE TO RELATED APPLICATION

This application is a continuation-in-part of applicant's co-pending application Ser. No. 14/270,520, filed May 6, 2014, the entire contents of which is hereby expressly incorporated by reference herein.

FIELD OF THE INVENTION

The present disclosure is in the field of outdoor equipment, and in particular, in the field of accessories for a table.

BACKGROUND OF THE DISCLOSURE

Going on a picnic in a park for a holiday, going to a tailgate party before a sporting event, or going to a cottage near a lake for a couple of days, or a week, and spending evenings around the picnic table with family and friends is a popular practice. During these events, when one typically uses a propane lantern to provide light at the table, the ambience is ruined by the glaring light from the lantern not to mention the loss of some valuable space on the table for the lantern to sit. A typical family, with their smartphones, tablets, wireless speakers, and not to mention parents trying to find space on the table for the other traditional camping paraphernalia such as condiments, plates, chip bowls, bottle opener, paper towel, etc., quickly run out of space on the table. During these activities, some revelers display either the national flag or the flag of their sports team. However, picnic tables marketed today are not equipped with flag holders.

Therefore, there is a need for a space-saving device to be used in combination with a table that allows users to outfit the table as desired.

SUMMARY OF THE INVENTION

Disclosed herein are table accessories comprising: a) a first vertical beam at a first end and a second vertical beam at a second end; b) at least one first angled beam rotatably connected to the first vertical beam; c) at least one second angled beam rotatably connected to the second vertical beam; d) a long horizontal beam rotatably connected to the first angled beam; e) a short horizontal beam rotatably connected to the second angled beam; and f) an internal horizontal beam extender portion capable of adjoining the long horizontal beam and the short horizontal beam and extending the length thereof.

BRIEF DESCRIPTION OF THE DRAWINGS

FIG. 3 is an illustration of a table accessory 300 comprising an internal horizontal beam extender portion 302.

FIG. 5 is an illustration of a first bracket 128 configured to receive the second vertical beam 148 comprising a metal plate 602.

FIG. 8A is an illustration of a cross section view of a rotatably adjustable swivel lock joint 202 at the point of connection between the second angled beam 204 and the short horizontal beam 116 showing the internal horizontal beam extender portion 302.

FIG. 8B is an illustration of a rotatably adjustable swivel lock joint 202 at the point of connection between the second angled beam 204 and the short horizontal beam 116.

FIG. 9 is an illustration of a cross section view of a rotatably adjustable swivel lock joint 102 at the point of connection between the second angled beam 114 and the short horizontal beam 116 showing the internal horizontal beam extender portion 302.

FIG. 11A is an illustration of a cross section view of an internal horizontal beam extender portion 302 comprising a male threaded knob 1102 and female threaded insert 1106, and a corresponding locking extender hole 144 and slidably encased in the long horizontal beam 118.

FIG. 11B is an illustration of the long horizontal beam 118 showing a male threaded knob 1102 and a corresponding locking extender hole 144.

FIG. 12A is an illustration of a middle shelf 133 and a corresponding shelf bracket 122 affixed to the first vertical beam 148.

FIG. 12B is an illustration of a cross section view of a middle shelf 133 and a corresponding shelf bracket 122 affixed to the first vertical beam 148.

DETAILED DESCRIPTION OF THE EMBODIMENTS

The following is a detailed description of certain specific embodiments of the table accessory disclosed herein. In this description reference is made to the drawings.

Definitions

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items. As used herein, the term "comprising" means including elements or steps that are identified following that term, but any such elements or steps are not exhaustive, and an embodiment can include other elements or steps.

Introduction

In one aspect, disclosed herein is a table accessory comprising: a) a first vertical beam at a first end and a second vertical beam at a second end; b) at least one first angled beam rotatably connected to the first vertical beam; c) at least one second angled beam rotatably connected to the second vertical beam; d) a long horizontal beam rotatably connected to the first angled beam; e) a short horizontal beam rotatably connected to the second angled beam; and f) a internal horizontal beam extender portion capable of adjoining the long horizontal beam and the short horizontal beam, wherein the table accessory further comprises a first bracket configured to receive the first vertical beam and a second bracket configured to receive the second vertical beam.

Disclosed herein are devices that connect to a table and provide a place other than the tabletop for the user to place condiments, utensils, napkins, lights, or electronic devices, or to personalize and decorate the table, for example for a holiday. The table accessory disclosed herein is configured to attach to any table with minimal effort. It spans the length of the table, which provides a convenient access to the accessory from any seat around the table.

Figure 1:
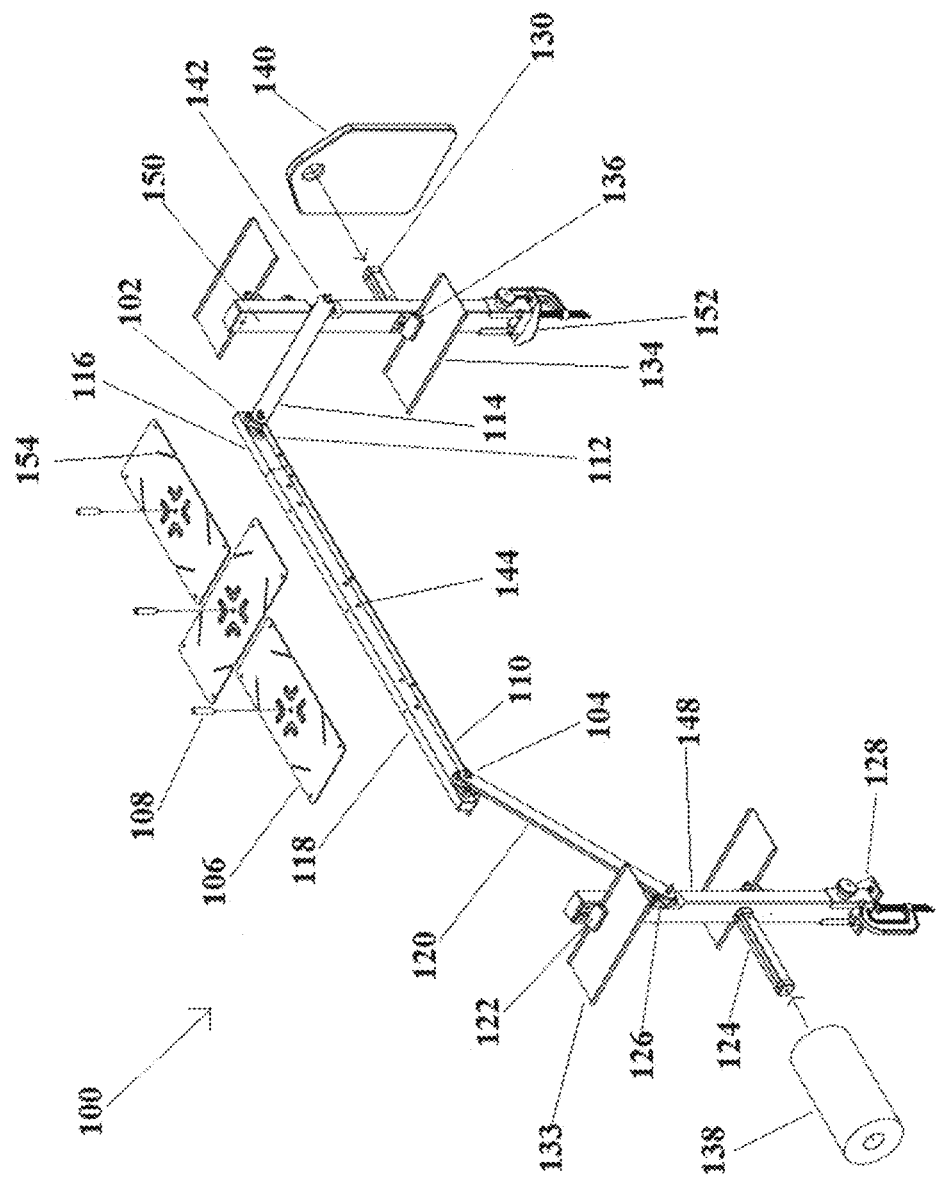
FIG. 1 is an illustration of a table accessory 100 comprising a first angled beam 120 at a first end and a second angled beam 114 configured on the same side of an adjoined long horizontal beam 118 and a short horizontal beam 116.

Referring to the drawings, FIG. 1 illustrates a table accessory 100 in the compressed horizontal beam position comprising a first angled beam 120 at a first end and a second angled beam 114 configured on the same side of an adjoined long horizontal beam 118 and a short horizontal beam 116. The table accessory 100 comprises a rotatably adjustable swivel lock joint 126 at the point of connection between the first angled beam 120 and the first vertical beam 148; a rotatably adjustable swivel lock joint 142 at the point of connection between the second angled beam 114 and the first vertical beam 150; a rotatably adjustable swivel lock joint 104 at the point of connection between the first angled beam 120 and the long horizontal beam 118; and a rotatably adjustable swivel lock joint 102 at the point of connection between the second angled beam 114 and the short horizontal beam 116. Furthermore, the table accessory 100 comprises a first bracket 128 configured to receive the first vertical beam 148 and a second bracket 152 configured to receive the second vertical beam 150, which in turn connect table accessory 100 to the table. FIG. 1 also depicts the table accessory 100 comprising a plurality of upper shelves 106 affixed to the long horizontal beam 118 via a plurality of threaded flag holders 108. Moreover, the table accessory 100 comprises a plurality of middle shelves 133 and a plurality of lower shelves 134 and corresponding shelf brackets 122 and 136 affixed to the first vertical beams 148 and 150. Additional elements of the table accessory 100 include an accessory mount 124 and an accessory mount 130 affixed to the first vertical beam 148 and to the second vertical beam 150, respectively. Examples of an accessory may include but are not limited to a paper towel roll 138, and a cutting board 140, etc. In some embodiments, the table accessory further comprises at least one accessory mount independently affixed to the first vertical beam 148 and to the second vertical beam 150.

Figure 2:
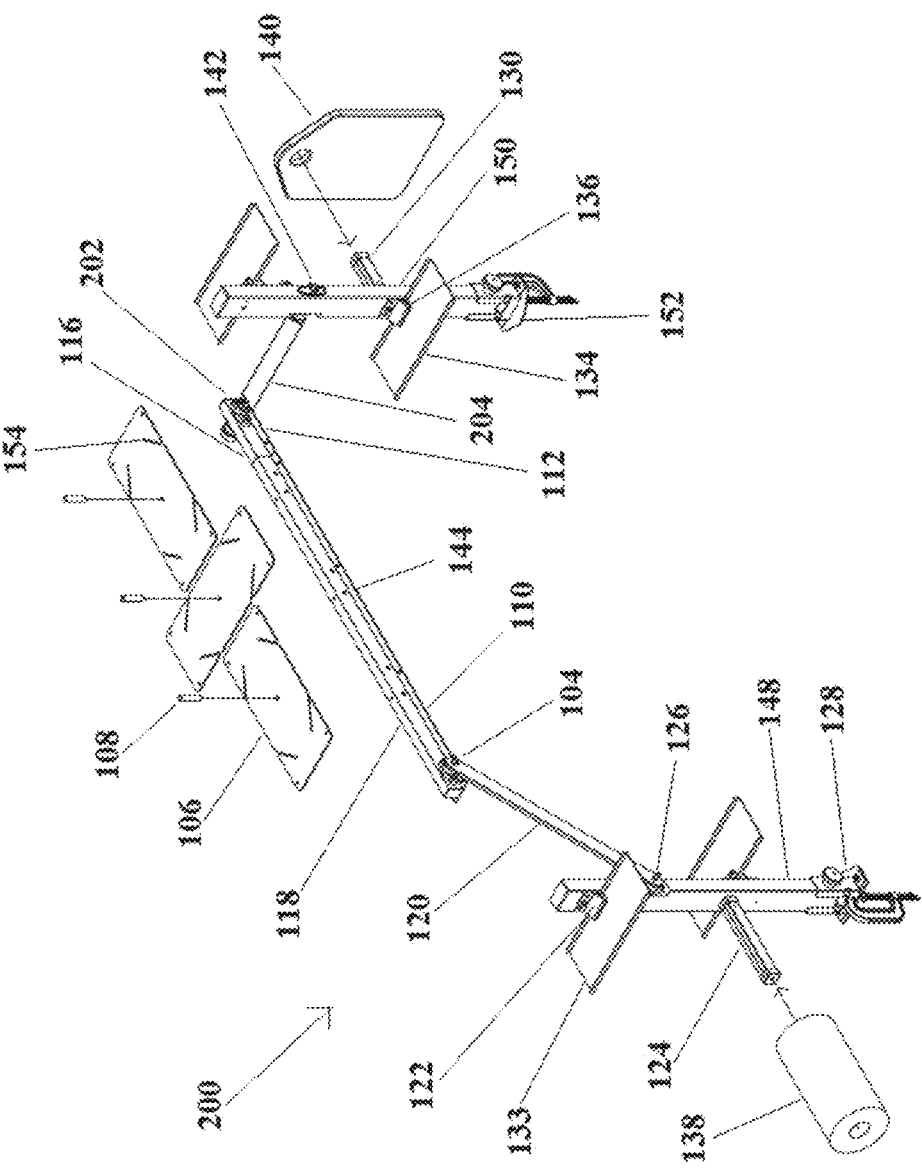
FIG. 2 is an illustration of a table accessory 200 comprising a first angled beam 120 at a first end and a second angled beam 204 configured on opposite sides of an adjoined long horizontal beam 118 and a short horizontal beam 116.

FIG. 2 illustrates a table accessory 200 in the compressed horizontal beam position comprising a first angled beam 120 at a first end and a second angled beam 204 configured on the opposite side of an adjoined long horizontal beam 118 and a short horizontal beam 116. The table accessory 200 comprises a rotatably adjustable swivel lock joint 126 at the point of connection between the first angled beam 120 and the first vertical beam 148; a rotatably adjustable swivel lock joint 202 at the point of connection between the second angled beam 204 and the first vertical beam 150; a rotatably adjustable swivel lock joint 104 at the point of connection between the first angled beam 120 and the long horizontal beam 118; and a rotatably adjustable swivel lock joint 202 at the point of connection between the second angled beam 204 and the short horizontal beam 116.

FIG. 3 illustrates a table accessory 300 in the extended horizontal beam position comprising an internal horizontal beam extender portion 302 and locking extender holes 144 spaced along the length of the long horizontal beam 118.

Figure 4B:
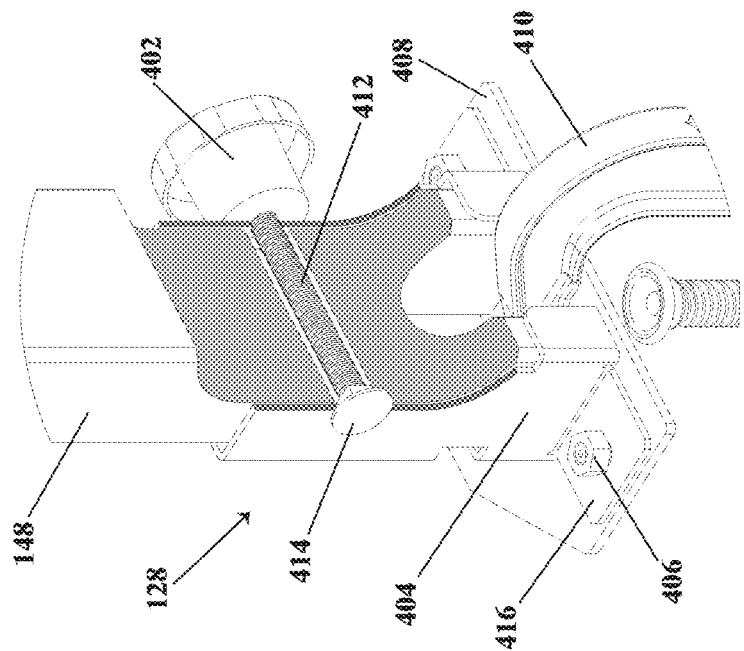
FIGS. 4B is an illustration of a cross section view of a second bracket 128 configured to receive the second vertical beam 148.
Figure 4A:
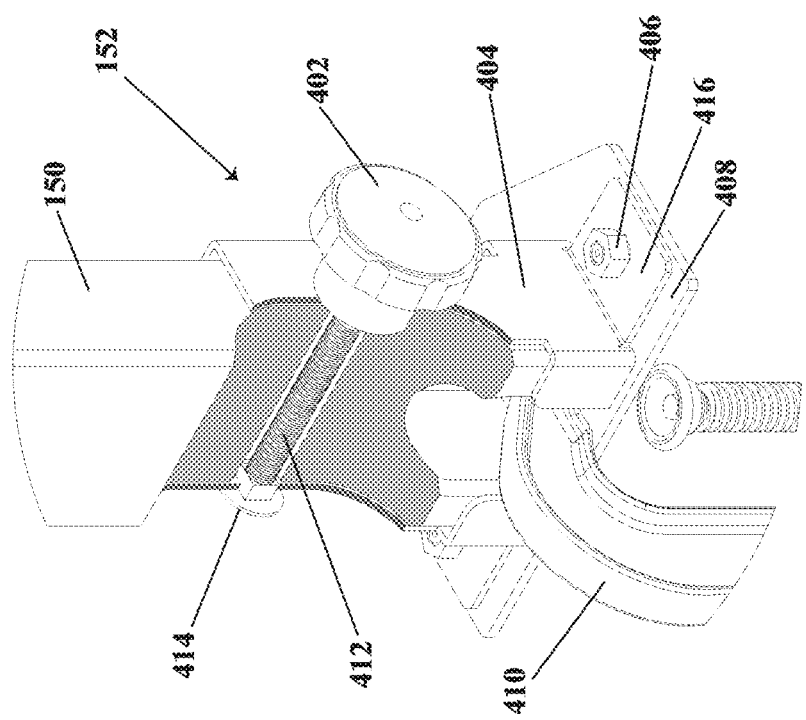
FIG. 4A is an illustration of a cross section view of a first bracket 152 configured to receive the first vertical beam 150.

FIGS. 4A and 4B illustrate rotated cross section views of a second bracket 152 configured to receive the second vertical beam 150 and a first bracket 128 configured to receive the first vertical beam 148, respectively. The first bracket 128 and the second bracket 152 comprise a carriage bolt 414 with threads 412 which are capable of engaging with a female threaded knob 402. The brackets 152 and 128 further comprise a bracket housing portion 404, mounting plate 416, fasteners 406 affixed to base plate 408 engaged with C-clamp 410. In some embodiments, the first vertical beam is configured to be affixed to the first bracket and the second vertical beam is configured to be affixed to the second bracket. In some embodiments, the first and second brackets are configured to be affixed to a table.

Referring back to FIG. 1, each of the vertical beams 148 and 150 fit inside brackets 128 and 152, respectively. In some embodiments, the user needs to tighten the female threaded knob 402 and carriage bolt 414 combination, thereby affixing the vertical beams 148 and 150 securely inside brackets 128 and 152, respectively.

The brackets 128 and 152 are in turn affixed to the table with an affixing means, such as a C-clamp 410 or a screw/nut combination, or a winged nut that tightens against the table, or any other suitable means. Turning to FIG. 5, the bracket 128 employs a large metal plate 602, which provides a larger surface area to grip the table for improved stability and reduced wear on the table surfaces as sandwiched between base plate 408 and the large metal plate 602.

Figure 6A:
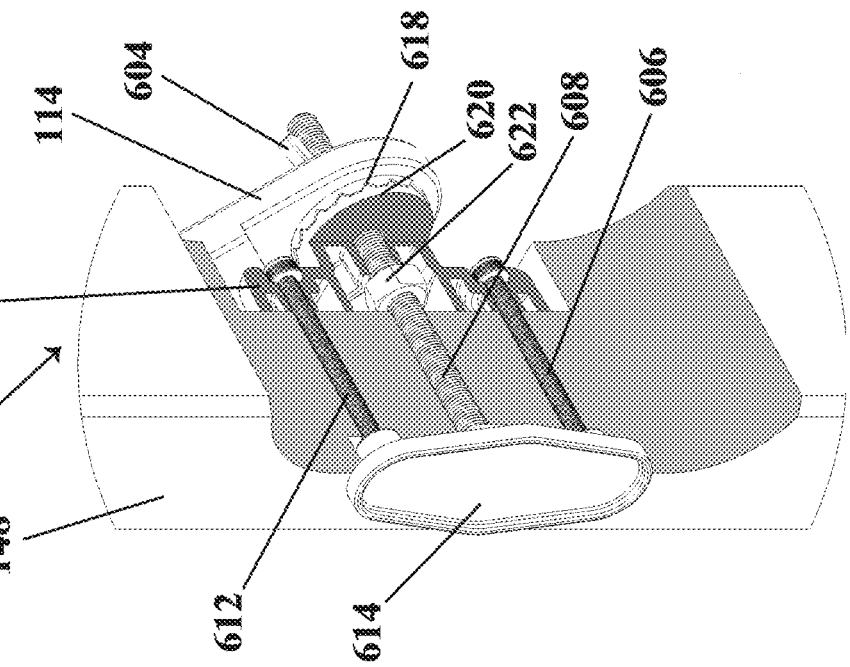
FIGS. 6A and 6B are rotated illustrations of a cross section view of a rotatably adjustable swivel lock joint 126 at the point of connection between the first angled beam 120 and the first vertical beam 148.
Figure 6B:
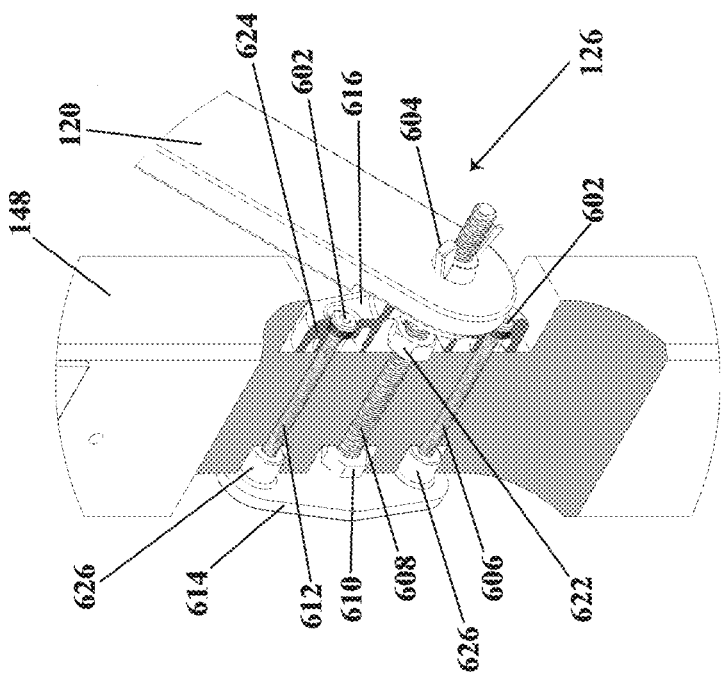

FIGS. 6A and 6B are illustrations of a cross section view of a rotatably adjustable swivel lock joint 126 at the point of connection between the first angled beam 120 and the first vertical beam 148. The rotatably adjustable swivel lock joint 126 comprises the first angled beam 120 which uses teeth 618 to mesh with the corresponding teeth 620 of the spacer bracket 616. The spacer bracket 616 is affixed to the first vertical beam 148 with bolts 612 and 606, which are threaded into the joint adapter plate 614 via female threaded portions 626 and tightened with allen heads 602 or a suitable bolt head. The allen heads 602 or a suitable bolt head are seated in recesses 624 of the spacer bracket 616. The first angled beam 120 employing teeth 618 to mesh with the corresponding teeth 620 of the spacer bracket 616 is locked in place at a selected angle with bolt 610 with wingnut 604 or another suitable fastener, tightened via hex bolt threads 608. Hex bolt 610 is held affixed to the first vertical beam 148 with nut 622 via the hex bolt threaded portion 608. Therefore, the user can loosen the rotatably adjustable swivel lock 126 and move the angled beam 120 to the desired angle, and then tighten the rotatably adjustable swivel lock 126 with wingnut 604 or another suitable fastener, to hold the angled beam 120 in place with respect to the first vertical beam 148. The rotatably adjustable swivel lock joint 126 of FIGS. 1-3, 6A and 6B is also representative of the rotatably adjustable swivel lock joint 142 of FIGS. 1-3 of the second vertical beam 150.

Figure 7:
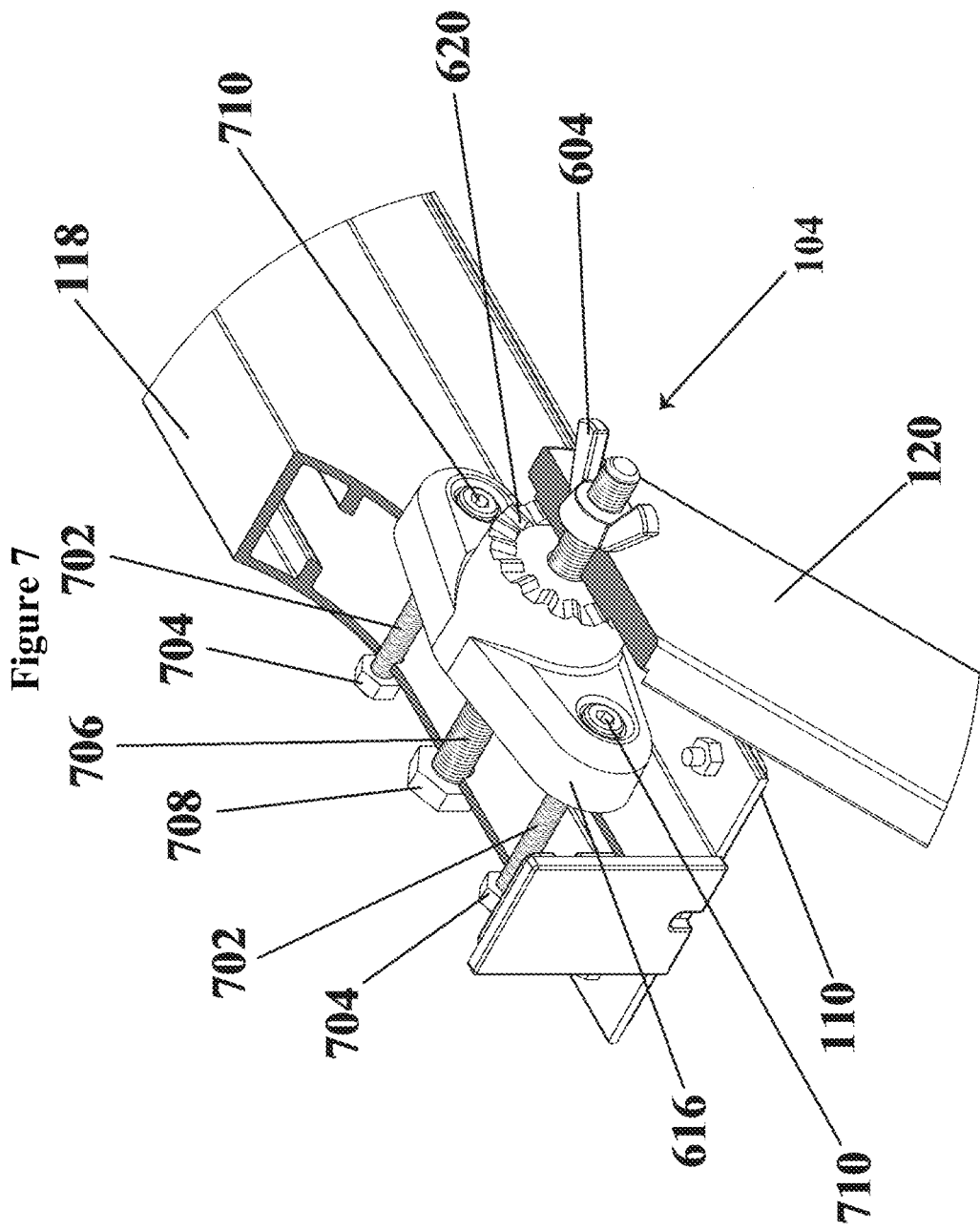
FIG. 7 is an illustration of a cross section view of a rotatably adjustable swivel lock joint 104 at the point of connection between the first angled beam 120 and the long horizontal beam 118.

FIG. 7 is an illustration of a cross section view of a rotatably adjustable swivel lock joint 104 at the point of connection between the first angled beam 120 and the long horizontal beam 118. The spacer bracket 616 of the rotatably adjustable swivel lock joint 104 with nuts 704 and threads 702, which are tightened via allen head bolts 710 or a suitable bolt. In similar fashion as the rotatably adjustable swivel lock joint 102 of FIG. 9, which illustrates hex bolt 708 is affixed to the long horizontal beam 118 with nut 902. Moreover, the rotatably adjustable swivel lock joint 104 comprises the first angled beam 120 and employs teeth 618 to mesh with the corresponding teeth 620 of the spacer bracket 616. The first angled beam 120 is locked against the spacer bracket 616 with hex bolt 708 with wingnut 604 or another suitable fastener, tightened via hex bolt threads 706.

FIGS. 8A and 8B are illustrations of a cross section view of a rotatably adjustable swivel lock joint 202 at the point of connection between the second angled beam 204 and the short horizontal beam 116 showing the internal horizontal beam extender portion 302. The rotatably adjustable swivel lock joint 202 comprises the spacer bracket 616 with the second angled beam 204 sandwiched between the hex bolt 806 and a hex bolt nut 808. The spacer bracket 616 and the second spacer bracket 802 of the rotatably adjustable swivel lock joint 202 using nuts 804 and threads 812 are tightened via allen head bolts 810 or a suitable bolt to affix the spacer bracket 616 and the second spacer bracket 802 to the the short horizontal beam 116. The second angled beam 204 employing teeth 618 to mesh with the corresponding teeth 620 of the spacer bracket 616 is held in place with hex bolt 806 with wingnut 604 or another suitable fastener, tightened against hex bolt threads 814. Furthermore, an internal horizontal beam extender portion 302 is affixed with an allen head bolt 810 or a suitable bolt running through aligned holes 816 and 818 of the short horizontal beam 116 and the internal horizontal beam extender portion 302, respectively, as illustrated in FIG. 8A.

FIG. 9 is an illustration of a cross section view of a rotatably adjustable swivel lock joint 102 at the point of connection between the second angled beam 114 and the short horizontal beam 116 showing the internal horizontal beam extender portion 302. The spacer bracket 616 of the rotatably adjustable swivel lock joint 114 with nuts 704 and threads 702, which are tightened via allen head bolts 710 or a suitable bolt. The hex bolt 708 is affixed to the short horizontal beam 116 with nut 902. Moreover, with the rotatably adjustable swivel lock joint 102 comprises the second angled beam 114 uses teeth 618 to mesh with the corresponding teeth 620 of the spacer bracket 616. The rotatably adjustable swivel lock joint 126 of FIG. 6B depicts the teeth 618, which are also employed herein with the rotatably adjustable swivel lock joint 102. The first angled beam 120 is locked against the spacer bracket 616 with hex bolt 708 with a wingnut 604 or another suitable fastener, tightened via hex bolt threads 706. Furthermore, an internal horizontal beam extender portion 302 is affixed with an allen head bolt 704 or a suitable bolt in similar fashion as rotatably adjustable swivel lock joint 202 illustrated in FIG. 8A.

In some embodiments, the table accessory further comprises a rotatably adjustable swivel lock joint at the point of connection between the first angled beam and the first vertical beam, wherein when the swivel lock joint is tightened, a friction lock is created thereby preventing the first angled beam to rotate with respect to the first vertical beam.

In some embodiments, the table accessory further comprises a rotatably adjustable swivel lock joint at the point of connection between the second angled beam and the second vertical beam, wherein when the swivel lock joint is tightened, a friction lock is created thereby preventing the second angled beam to rotate with respect to the second vertical beam.

In some embodiments, the table accessory further comprises a rotatably adjustable swivel lock joint at the point of connection between the first angled beam and the long horizontal beam, wherein when the swivel lock joint is tightened, a friction lock is created thereby preventing the first angled beam to rotate with respect to the long horizontal beam.

In some embodiments, the table accessory further comprises a rotatably adjustable swivel lock joint at the point of connection between the second angled beam and the short horizontal beam, wherein when the swivel lock joint is tightened, a friction lock is created thereby preventing the second angled beam to rotate with respect to the short horizontal beam.

In some embodiments, the table accessory further comprises a rotatably adjustable swivel lock joint at the point of connection between the second angled beam and the short horizontal beam, wherein the first angled beam and the second angled beam are affixed to the same side or opposed sides of the adjoined long horizontal beam and the short horizontal beam.

Figure 10:
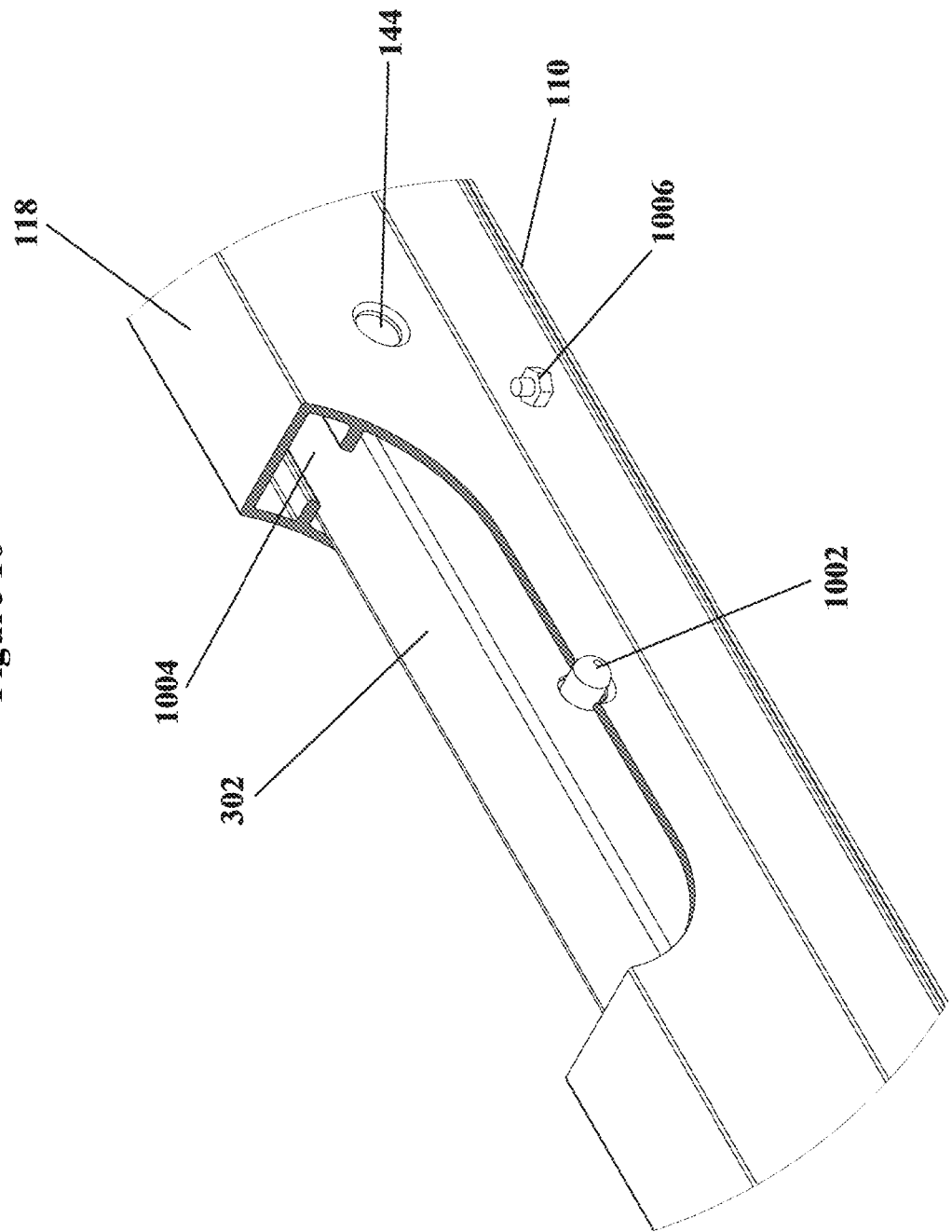
FIG. 10 is an illustration of a cross section view of an internal horizontal beam extender portion 302 comprising a snap-fit button 1002 and a corresponding locking extender hole 144 and slidably encased in the long horizontal beam 118.

FIG. 10 is an illustration of a cross section view of an internal horizontal beam extender portion 302, which is slidably encased and adjustable via an extender portion channel 1004 within the long horizontal beam 118 and comprising a snap-fit button 1002 and a corresponding locking extender hole 144. The terminal end of the internal horizontal beam extender portion 302 is affixed to a rotatably adjustable swivel lock joint 202 or 102 as depicted with FIGS. 8A and 9, respectively. The internal horizontal beam extender portion 302 may comprises a snap-fit button 1002 capable of locking within after compressing snap-fit button 1002 and sliding the internal horizontal beam extender portion 302 to the desired length with a corresponding extender hole 144 which are spaced along the length of the long horizontal beam 118 to extend the length of the horizontal beams as depicted with FIG. 3 showing an extended position for the table accessory 300.

FIGS. 11A and 11B are an illustration of a cross section view of an internal horizontal beam extender portion 302, which is slidably adjustable via an extender portion channel 1004 within and the long horizontal beam 118 comprising a male threaded knob 1102 and female threaded insert 1106, and a corresponding locking extender hole 144. In some embodiments, the horizontal beam extender comprises at least one locking mechanism. In some embodiments, the horizontal beam extender comprises at least one locking mechanism comprising a snap-fit button or a male threaded knob capable of locking the horizontal beam extender in a position relative to the long horizontal beam. In some embodiments, the horizontal beam extender is capable of adjusting the length of the horizontal beam from between about 6 feet to about 8 feet.

In some embodiments, the long horizontal beam and/or the short horizontal beam each independently comprise at least one metal plate. As illustrated with FIGS. 1-3 and FIG. 10, the long horizontal beam 118 and a short horizontal beam 116 comprise metal plate 110 and metal plate 112, respectively. In some embodiments, the metal plate 110 and/or the metal plate 112 are at the sides of the long horizontal beam 118 and a short horizontal beam 116, respectively. In other embodiments, the metal plate 110 is long, i.e., longer than 1 foot, or alternatively covers more than half the length of the long horizontal beam 118. In other embodiments, the metal plate 110 covers less than a third of the length of the beam 118. In other embodiments, the metal plate 110 runs the entire, or nearly the entire, span of the horizontal beam 118. In some embodiments, a logo, for example that of the manufacturer or the retailer of the accessory 100, is placed on the metal plate 110 and/or the metal plate 112. In some embodiments, the metal plate 110 and/or the metal plate 112 is attached to the long horizontal beam 118 and the short horizontal beam 116 by two or more washers and screws 1006 that sandwich the horizontal beam, washers, and the metal plate together.

In some embodiments, the long horizontal beam 118 and the short horizontal beam 116 each comprise a second metal plate either in addition to, or in lieu of, the metal plate 110 and/or the metal plate 112. While the metal plate 110 and/or the metal plate 112 is located at the sides of the long horizontal beam 118 and the short horizontal beam 116, respectively, the second metal plate is placed on the underside of the horizontal beams. In some embodiments, the second metal plate is placed at the center of the horizontal beams. In other embodiments, the second metal plate is long, i.e., longer than 1 foot, or alternatively covers more than half the length of the beams. In other embodiments, the second metal plate covers less than a third of the length of the beams. In other embodiments, the second metal plate runs the entire, or nearly the entire, span of the horizontal beams.

FIGS. 12A and 12B are illustrations of a middle shelf 133 and a corresponding shelf bracket 122 affixed to the first vertical beam 148. The shelf bracket 122 is affixed to the first vertical 148 with fasteners 1202 and a bolt 1208 which is tightened into threaded insert 1206.

Figure 13:
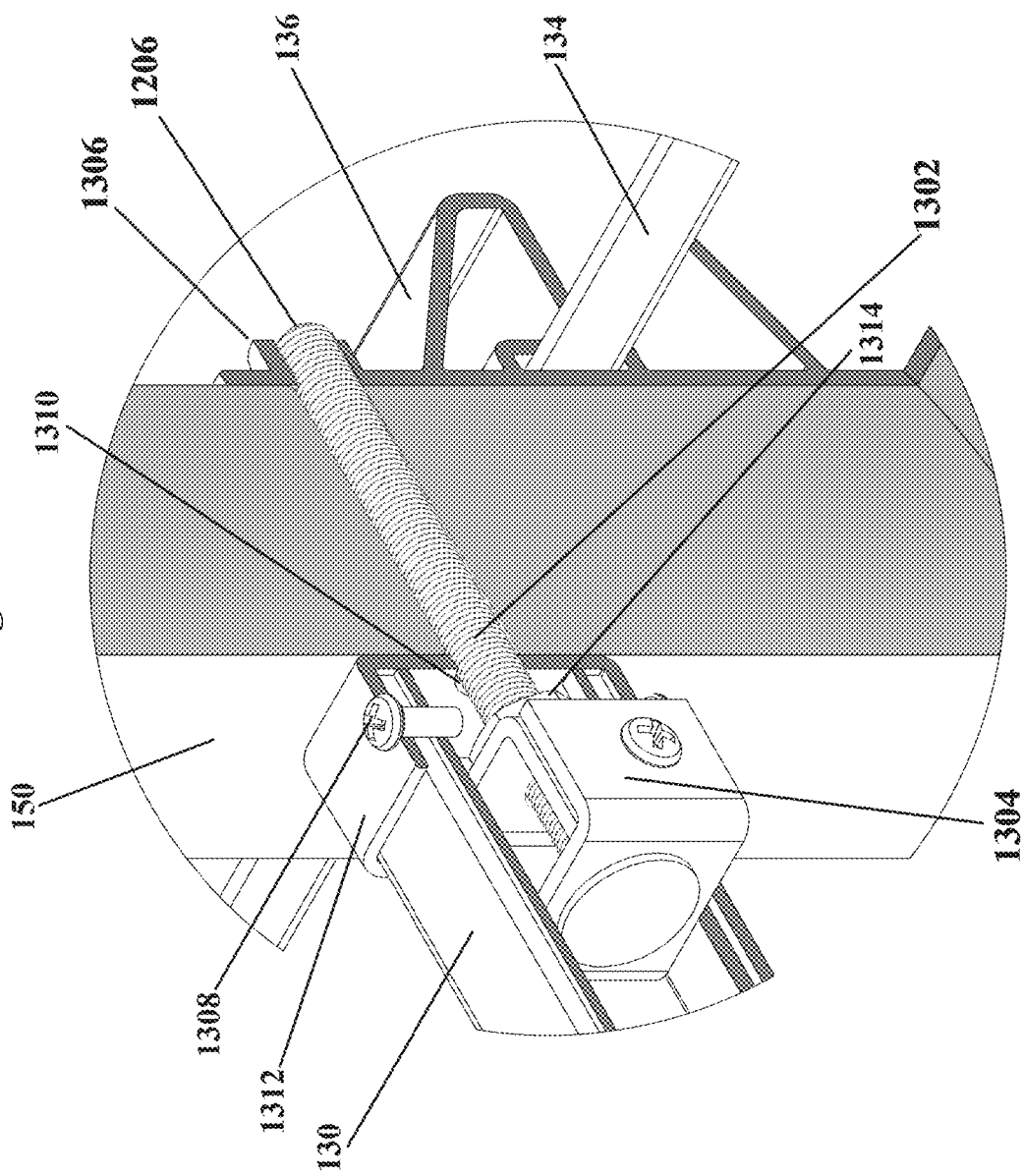
FIG. 13 is an illustration of a cross section view of a lower shelf 134 and an accessory mount 130 affixed to the first vertical beam 150 with a carriage bolt 1302 and carriage bolt bracket assembly 1304.

FIG. 13 is an illustration of a cross section view a lower shelf 136 and an accessory mount 130 affixed to the first vertical beam 150 with a carriage bolt 1302 and carriage bolt bracket assembly 1304. The lower shelf 136 and a corresponding shelf bracket 136 is affixed to the first vertical beam 150. The lower shelf 134 is affixed to the shelf bracket 136, which in turn is affixed to the second vertical beam 150 via fasteners 1202 and a carriage bolt 1302, which is tightened into threaded insert 1306. The carriage bolt 1302 is affixed to the carriage bolt bracket assembly 1304 with nut 1314, which is affixed inside an accessory mount 130. The carriage bolt 1302 is inserted into a vertical mount hole 1310 along with the accessory mount 130 and the carriage bolt 1302 is tightened with lagged bolt head 1206 into threaded insert 1206 and fastener 1308 is tightened against bracket 1312 in order to hold the accessory mount 130 affixed to the first vertical beam 150. The plurality of lower shelves 134 and the preceding discussion are intended to be adaptable to the plurality of middle shelves 133 of the disclosure herein.

In some embodiments, the table accessory further comprises a plurality of lower shelves and a plurality of middle shelves each mounted to the first vertical beam and the second vertical beam. In some embodiments, the table accessory further comprises a plurality of lower shelves and a plurality of middle shelves each independently comprising one or more magnetic portions 1204 on the underside of each shelf. In some embodiments, the plurality of middle shelves 133 and a plurality of lower shelves 134 are different sizes, whereas in other embodiments, the plurality of middle shelves 133 and the plurality of lower shelves 134 are of the same size. In some embodiments, there is only one middle shelf 133 and/or one lower shelf 134 on one side of the accessory 100. In other embodiments, there is only one middle shelf 133 and/or one lower shelf 134 on either side of the accessory 100. In other embodiments, there is only one middle shelf 133 and/or one lower shelf 134 side of the accessory 100, but two middle shelves 133 and/or two lower shelves 134 on the opposite side of the accessory 100. In other embodiments, there are two middle shelves 133 and/or two lower shelves 134 sides of the accessory 100. In still other embodiments, there are more than two shelves on a single vertical beam. In some embodiments, the vertical beams 148 and 150 comprises one or more vertical mount holes 1310 where the middle shelves 133 and/or the lower shelves 134 are to be connected. Other methods of holding the middle shelves 133 and/or the lower shelves 134 in place known in the art are also contemplated.

In some embodiments, the middle shelves 133 and/or the lower shelves 134 comprise a plurality of holes arrayed around the perimeter, the middle, and/or on the vertical component, thereof to support hooks. The hooks allow objects, such as cooking utensils, to hang from the middle shelves 133 and/or the lower shelves 134. In some embodiments, a cord, such as a bungee cord, connects a shelf on the first vertical beam 148 with another shelf on the second vertical beam 150, as, for example, a temporary clothes line to hang face cloths, wet fabrics, etc., to dry.

Figure 14:
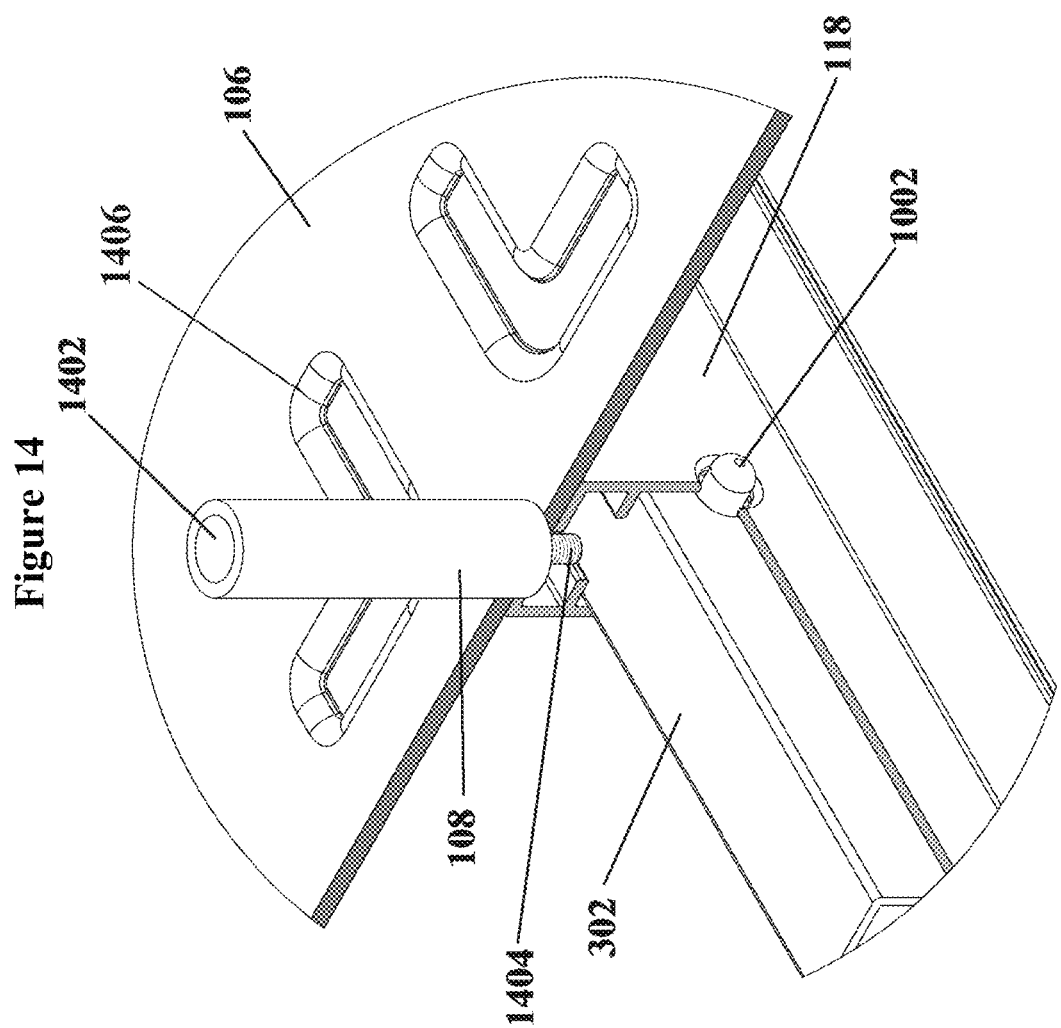
FIG. 14 is an illustration of a cross section view of an upper shelf 106 comprising a plurality of upper shelf indentions 1406 and affixed to the long horizontal beam 118 via a flag holder 108 comprising threads 1404.

FIG. 14 is an illustration of a cross section view of an upper shelf 106 affixed to the long horizontal beam 118 via a flag holder 108. In some embodiments, the long horizontal beam and/or the short horizontal beam each independently comprise a plurality of upper shelves 106 affixed to the long horizontal beam and/or the short horizontal beam via flag holders 108 via threads 1404. In some embodiments, the plurality of upper shelves 106 comprising a plurality of upper shelf indentions 1406. The upper shelf indentions 1406 are arranged on each side of the long horizontal beam and/or the short horizontal beam and prevent the upper shelves 106 from rotating. Flag poles of flags may be set in the inner flag holder cavity 1402. In some embodiments, the long horizontal beam and/or the short horizontal beam each independently comprise a plurality of flag holders capable of receiving a flag. In some embodiments, the upper shelves comprise a plurality of slits 154 depicted in FIGS. 1 and 2 that are capable of accommodating one or more flags.

FIGS. 1-3 shows the table accessory 100 in its open position. When not in use and for storage purposes, the accessory 100 can collapse on itself to minimize it volume. In one embodiment, the accessory 100 is removed from the second bracket 152 and the first bracket 128, flag holders 108 and upper shelves 106, wingnuts 604 or another suitable fastener, are loosened and the middle and lower shelves 133 and 134 are removed. The swivel lock joints 104 and 102 or 202 are each moved in line with the first vertical beam 148 and the second vertical beam 150, such that the swivel lock joints 104 and 102 or 202 and the first bracket 128 and the second bracket 152, are the opposite ends of the line created by the beams. The long horizontal beam 118 and a short horizontal beam 116 is made to pivot around the swivel lock joint 104, such that the swivel lock joint 102 or 202 comes in close proximity to the point where the second bracket 152 and the first bracket 128 were attached. The first vertical beam 148 and the second vertical beam 150 and the first angled beam 120 and the second angled beam 114 or 204 are brought in a straight line and the assembly is swung in the opposite direction of the long horizontal beam 118 and a short horizontal beam's 116 motion, such that the point where the second bracket 152 was attached is at the opposite end of the collapsed structure as the point where the first bracket 128 was attached.

In some embodiments, a storage compartment is attached to the plurality of lower shelves and a plurality of middle shelves via the one or more magnetic portions 1204. In some embodiments, the storage compartment is large enough to house an electronic tablet (e.g., an iPad®), or an MP3 device (e.g., an iPod®).

In some embodiments, a light, for example an LED light or a flash light, is attached to the long horizontal beam 118 and/or the short horizontal beam 116.

In certain embodiments, the light attaches to the one or more magnetic portions 1204. In other embodiments, the light screws onto the long horizontal beam 118 or the short horizontal beam 116.

In some embodiments, the accessory 100 disclosed herein is configured to be attached to a picnic table with a length of between 5 feet to about 9 feet. In some embodiments, the accessory 100 disclosed herein is configured to be attached to the bed of a pickup truck or to the roof of a car. This attachment allows for the display of an array of flags during a tailgate party.

In some embodiments, a bottle opener is attached to one of the vertical beams of the accessory 100 for an easy and convenient access thereto.

The presently disclosed table accessory is not to be limited in scope by the specific embodiments described herein, which are intended as single illustrations of individual aspects of the presently disclosed devices and methods, and functionally equivalent devices, methods and components are within the scope of the presently disclosed table accessory. Indeed, various modifications of the presently disclosed table accessory, in addition to those shown and described herein will become apparent to those skilled in the art from the foregoing description and accompanying drawings. Such modifications are intended to fall within the scope of the appended claims.

What is claimed is:

1. A table accessory comprising:
   a) a first vertical beam at a first end and a second vertical beam at a second end;
   b) at least one first angled beam rotatably connected to the first vertical beam;
   c) at least one second angled beam rotatably connected to the second vertical beam;
   d) a long horizontal beam rotatably connected to the first angled beam;
   e) a short horizontal beam rotatably connected to the second angled beam; and
   f) an internal horizontal beam extender portion capable of adjoining the long horizontal beam and the short horizontal beam and extending the length thereof.

2. The table accessory of claim 1, further comprising a first bracket configured to receive the first vertical beam and a second bracket configured to receive the second vertical beam.

3. The table accessory of claim 2, wherein the first and second brackets are configured to be affixed to a table.

4. The table accessory of claim 2, wherein the first vertical beam is configured to be affixed to the first bracket and the second vertical beam is configured to be affixed to the second bracket.

5. The table accessory of claim 1, further comprising a rotatably adjustable swivel lock joint at the point of connection between the first angled beam and the first vertical beam, wherein when the swivel lock joint is tightened, a friction lock is created thereby preventing the first angled beam to rotate with respect to the first vertical beam.

6. The table accessory of claim 1, further comprising a rotatably adjustable swivel lock joint at the point of connection between the second angled beam and the second vertical beam, wherein when the swivel lock joint is tightened, a friction lock is created thereby preventing the second angled beam to rotate with respect to the second vertical beam.

7. The table accessory of claim 1, further comprising a rotatably adjustable swivel lock joint at the point of connection between the first angled beam and the long horizontal beam, wherein when the swivel lock joint is tightened, a friction lock is created thereby preventing the first angled beam to rotate with respect to the long horizontal beam.

8. The table accessory of claim 1, further comprising a rotatably adjustable swivel lock joint at the point of connection between the second angled beam and the short horizontal beam, wherein when the swivel lock joint is tightened, a friction lock is created thereby preventing the second angled beam to rotate with respect to the short horizontal beam.

9. The table accessory of claim 1, further comprising a rotatably adjustable swivel lock joint at the point of connection between the second angled beam and the short horizontal beam, wherein the first angled beam and the second angled beam are affixed to the same side or opposed sides of the adjoined long horizontal beam and the short horizontal beam.

10. The table accessory of claim 1, wherein the long horizontal beam and/or the short horizontal beam each independently comprise a plurality of flag holders capable of receiving a flag.

11. The table accessory of claim 1, wherein the long horizontal beam and/or the short horizontal beam each independently comprise a plurality of upper shelves.

12. The table accessory of claim 1, wherein the long horizontal beam and/or the short horizontal beam each independently comprise at least one metal plate.

13. The table accessory of claim 1, further comprising a plurality of lower shelves and a plurality of middle shelves each mounted to the first vertical beam and the second vertical beam.

14. The table accessory of claim 1, further comprising a plurality of lower shelves and a plurality of middle shelves each independently comprising one or more magnetic portions on the underside of each shelf.

15. The table accessory of claim 1, wherein the horizontal beam extender comprises at least one locking mechanism.

16. The table accessory of claim 1, wherein the horizontal beam extender comprises at least one locking mechanism comprising a snap-fit button or a male threaded knob capable of locking the horizontal beam extender in a position relative to the long horizontal beam.

17. The table accessory of claim 1, wherein the horizontal beam extender is capable of adjusting the length of the horizontal beam from between about 6 feet to about 8 feet.

18. The table accessory of claim 1, further comprising at least one accessory mount independently affixed to the first vertical beam and the second vertical beam.

\* \* \* \* \*